United States Patent [19]
Kawai et al.

[11] Patent Number: 5,136,701
[45] Date of Patent: Aug. 4, 1992

[54] PROCESSING UNIT CONTAINING DMA CONTROLLER HAVING CONCURRENT OPERATION WITH PROCESSOR WHEREIN ADDRESSES AND DATA ARE DIVIDED INTO TWO PARTS

[75] Inventors: Hiroyuki Kawai; Hideyuki Terane, both of Hyogo, Japan

[73] Assignee: Mitsubishi Denki Kabushiki Kaisha, Tokyo, Japan

[21] Appl. No.: 725,117

[22] Filed: Jul. 3, 1991

[30] Foreign Application Priority Data

Jul. 4, 1990 [JP] Japan ................................. 2-179102

[51] Int. Cl.$^5$ ............................................. G06F 13/14
[52] U.S. Cl. ................................. 395/425; 364/232.9; 364/242.4
[58] Field of Search ... 364/200 MS File, 900 MS File; 395/425

[56] References Cited

U.S. PATENT DOCUMENTS

4,920,480  4/1990  Murakami et al. .................. 364/200
5,045,993  9/1991  Murakami et al. .................. 364/200

*Primary Examiner*—Lawrence E. Anderson
*Attorney, Agent, or Firm*—Lowe, Price, LeBlanc & Becker

[57] ABSTRACT

A processing unit containing a DMA controller comprises a 2nb (n≧1) processor data bus (6), a 2nb DMA data bus (7), a 2nb (m≧1) processor address bus (8), and a 2nb DMA address bus (9). These buses have a plurality of latch circuits (51-54) respectively connected thereto. One of the processor and DMA data latched in each latch circuit, and one of the processor and DMA addresses are selected by a first multiplexer (55, 56). The 2nb data and 2mb data from the output of the first multiplexer and the outputs of the latch circuits are divided into sets of nb and mb, respectively; thus they are given in the form of 3 inputs to a second multiplixer (57-60). When the processor and the DMA controller concurrently operate, data and address are transferred without keeping one of them waiting.

6 Claims, 8 Drawing Sheets

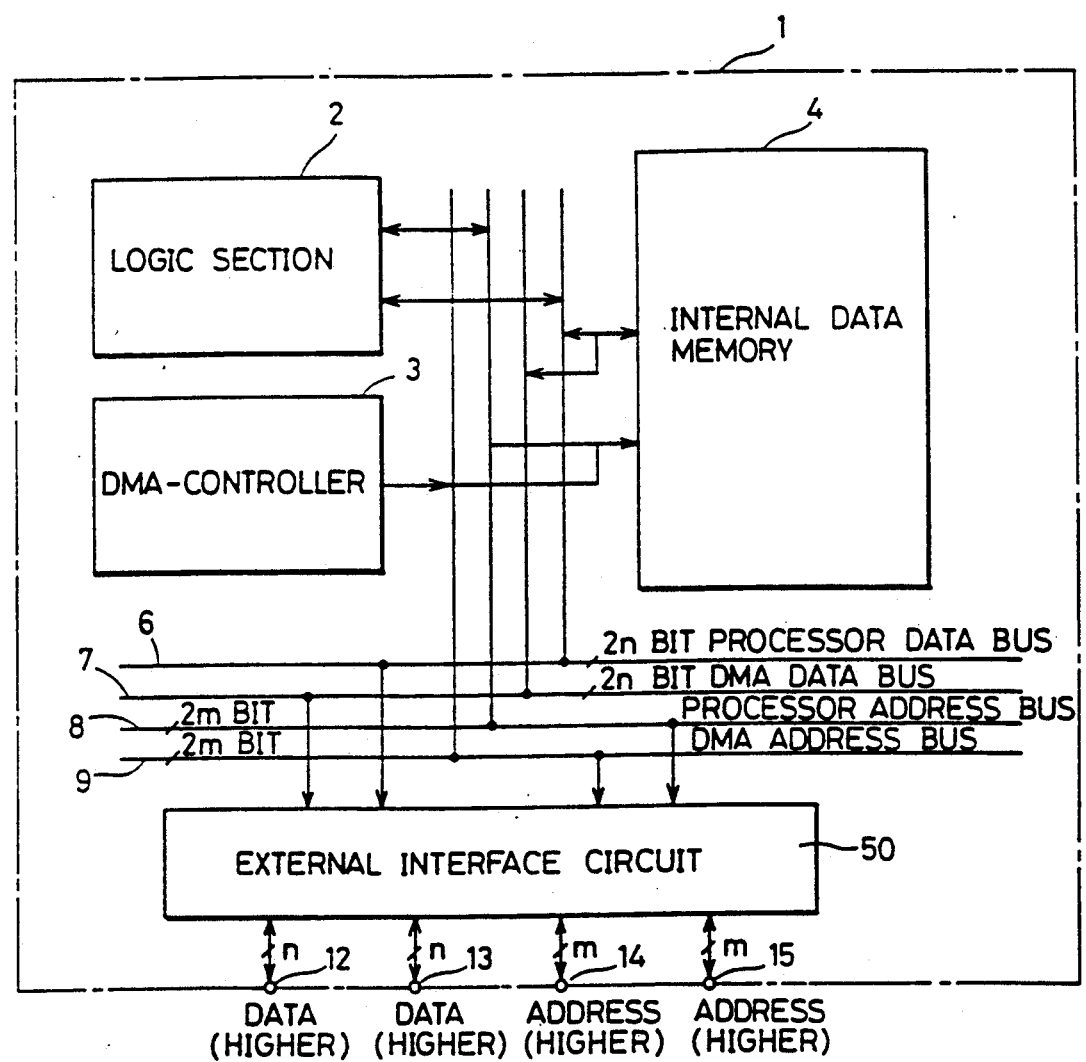

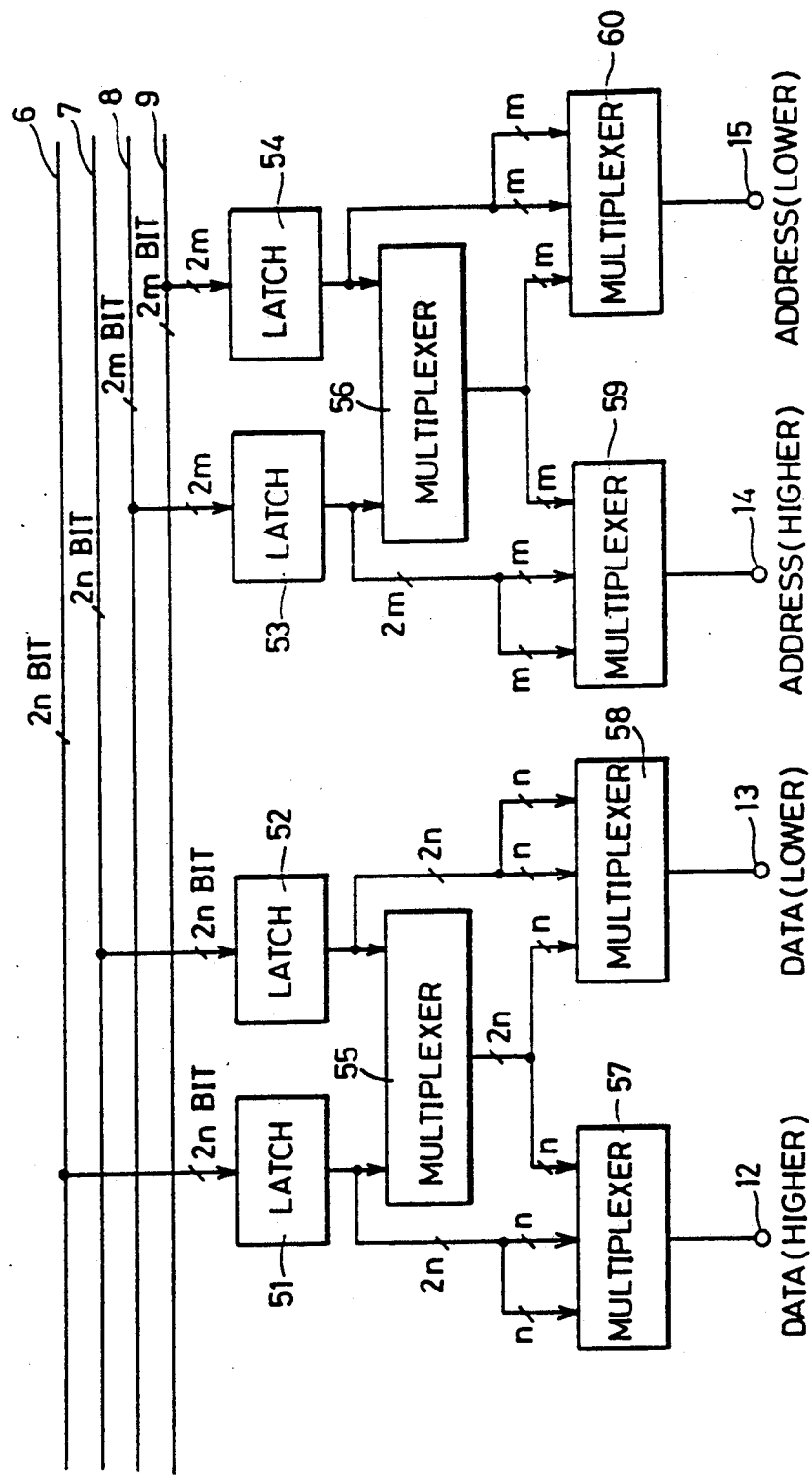

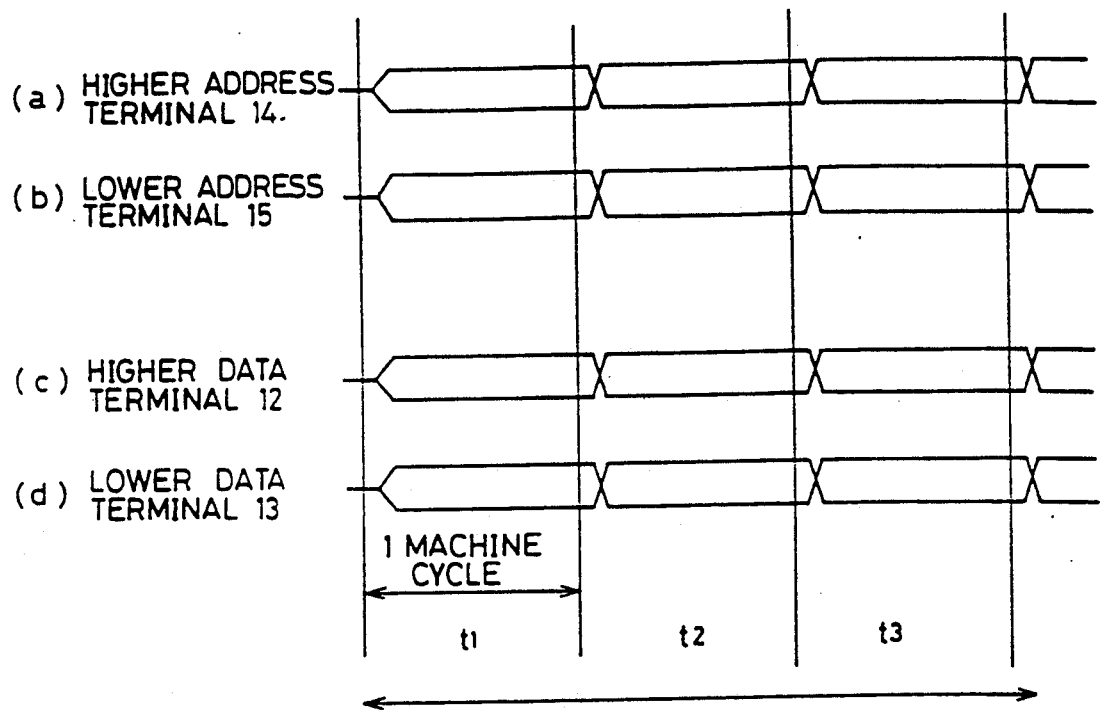
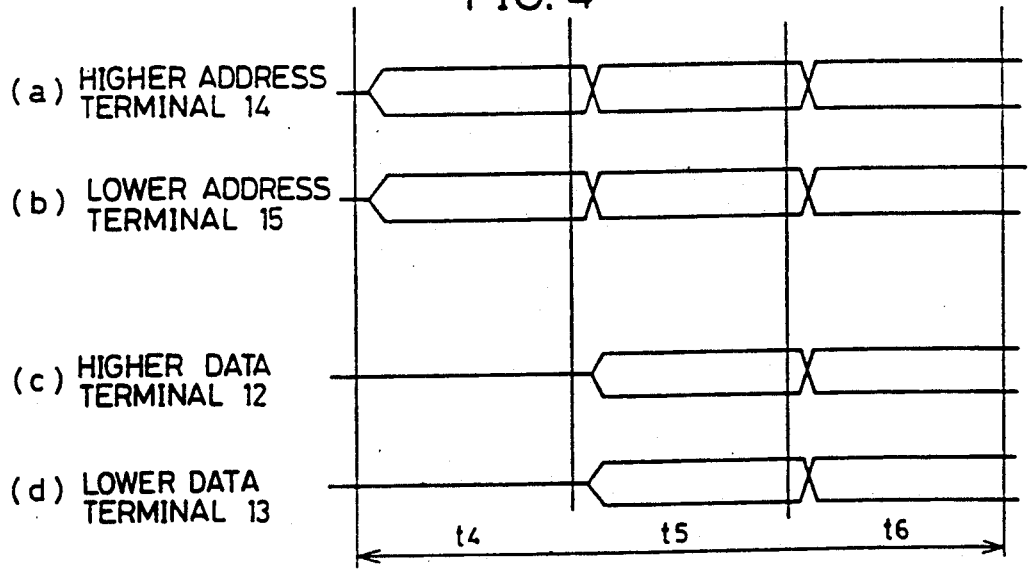

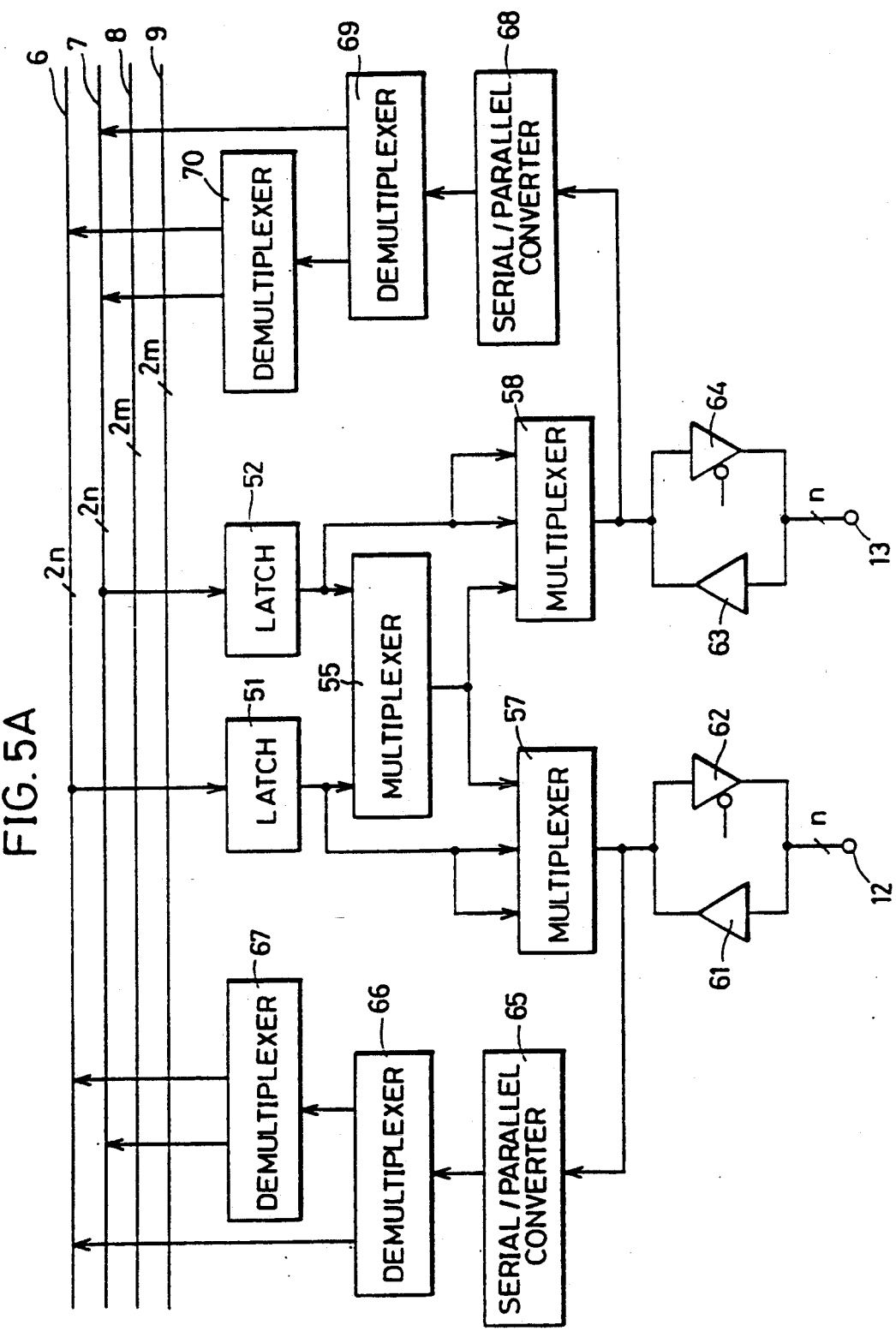

PROCESSING UNIT CONTAINING DMA CONTROLLER HAVING CONCURRENT OPERATION WITH PROCESSOR WHEREIN ADDRESSES AND DATA ARE DIVIDED INTO TWO PARTS

BACKGROUND OF THE INVENTION

1. Field of the Invention

This invention relates to a processing unit containing a DMA controller, and more particularly it relates to a processing unit containing a DMA controller wherein transfer of processor data and DMA data and processor address and DMA address is improved.

2. Description of the Background Art

FIG. 6 is a schematic block diagram of a processor containing a prior DMA controller. A processor 1 comprises a logic section 2, a DMA controller 3, an internal data memory 4 and an external interface circuit 5. The logic section 2, internal data memory 4 and external interface circuit 5 are connected together by a 2 n-bit processor data bus 6, a 2 n-bit DMA data bus 7, a 2 m-bit processor address bus 8 and a 2 m-bit DMA address bus 9, the DMA controller 3 being connected to the DMA address bus 9.

FIG. 7 is a more specific block diagram of the external interface circuit shown in FIG. 5. In FIG. 7, the processor data bus 6 is connected to a latch 51, the DMA data bus 7 is connected to a latch 52, the processor address bus 8 is connected to a latch 53 and the DMA address bus 9 is connected to a latch 54. The outputs of the latches 51 and 52 are connected to a multiplexer 55, which outputs data latched in the latch 51 or 52 to a data terminal 10. The outputs of the latches 53 and 54 are given to a multiplexer 56, which outputs an address latched in the latch 53 or 54 to an address terminal 11.

FIG. 8 is a diagram showing the transfer timing for concurrent operation in the external interface circuit shown in FIG. 7.

Referring to FIGS. 6 through 8, the transfer operation of data and address in a processor containing a conventional DMA controller will now be described. When concurrent operation of the processor 1 and the DMA controller 3 does not take place and the data from the processor data bus 6 is outputted, the data from the processor data bus 6 is latched in the latch 51, and the data latched in the latch 51 by the multiplexer 55 is selected and outputted to the data terminal 10. As in the case of data, an address from the processor address bus 8 is latched in the latch 53, selected by the multiplexer 56 and outputted to the address terminal 11.

On the other hand, when the concurrent operation of the processor 1 and the DMA controller 3 takes place, for example, supposing that the processor 1 is kept waiting, the data from the DMA data bus 7 is latched in the latch 52, selected by the multiplexer 55 and outputted to the data terminal 10. Similarly, the address from the DMA address bus 9 is latched in the latch 54, selected by the multiplexer 56 and outputted to the address terminal 11.

As described above, when the processor 1 and the DMA controller 3 concurrently operate, one transfer alone is performed while the other is kept waiting. For example, as shown in FIG. 8, in the case where transfer is performed such that the DMA controller 3 transfers data in the burst mode to continuously transfer m words, the processor 1 is kept waiting for at least m machine cycles, resulting in a decrease in transfer efficiency.

SUMMARY OF THE INVENTION

Accordingly, the principal object of the invention is to provide a processing unit containing a DMA controller capable of improving the effective transfer efficiency, wherein when memory access for external data and DMA transfer by instructions take place at the same time, the need for keeping one of the two waiting is eliminated.

In brief, this invention is a processing unit containing a DMA controller, comprising a 2 nb ($n \geq 1$) processor data bus, a 2 nb DMA data bus, a 2 mb ($m \geq 1$) processor address bus, and a 2 mb DMA address bus. These buses have a plurality of latch circuits respectively connected thereto. One of the processor and DMA data latched in each latch circuit, and one of the processor and DMA addresses are selected by a first multiplexer. The 2 nb and 2 mb data from the output of the first multiplexer and the outputs of the latch circuits are divided into sets of nb and mb, respectively; thus, they are given in the form of 3 inputs to the first multiplexer.

Therefore, according to this invention, when there is no concurrent operation, 2 nb DMA transfer data are outputted from the 2 nb data input/output terminal, while when a concurrent operation takes place, the DMA transfer data when outputted, are time-divided into higher nb and lower nb. As for addresses, they are outputted in the same manner as for data, whereby data can be efficiency transferred without keeping one of the two waiting.

In a more preferable embodiment, when either the processor or the DMA controller singly operates, the first and second data input/output terminals are given either the 2 nb processor data or the 2 nb DMA data as divided into sets of nb. When the processor and the DMA controller concurrently operate, the 2 nb processor data are inputted mb each time in a time division manner to the second input/output terminal, to which the 2 nb DMA data are also inputted nb each time in a time division manner. When either the processor or the DMA controller singly operates, either processor or DMA data are converted into 2 n-bit parallel data and outputted to either the processor data bus or the DMA data bus. When the processor and the DMA controller concurrently operate, the processor data and DMA data divided into sets of n bits are outputted to the processor data bus and DMA data bus in a time division manner.

Further, in a more preferable embodiment, when either the processor or the DMA controller singly operates, either the 2 nb processor address or the 2 mb DMA address, divided into sets of mb, is given to the first address input/output terminal. When the processor and the DMA controller concurrently operate, the 2 mb processor address, divided into sets of mb, is given in a time division manner to the first address input/output terminal, while the 2 mb DMA address, divided into sets of mb, is given in a time division manner to the second address input/output terminal. When either the processor or the DMA controller singly operates, the inputted address is converted into a parallel address, which is outputted to either the processor address bus or the DMA address bus. When the processor and the MDA controller concurrently operate, the processor and DMA address parallelly divided into sets of m in a time division manner are outputted to the processor address bus and DMA address bus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic block diagram showing the entire arrangement of an embodiment of this invention;

FIG. 2 is a more specific block diagram of an external interface circuit shown in FIG. 1;

FIGS. 3(a)-(d) and 4(a)-(d) are timing charts showing the transfer timing for the external interface circuit shown in FIG. 2;

FIGS. 5A and 5B are block diagrams of an external interface circuit showing another embodiment of the invention;

DESCRIPTION OF THE PREFERRED EMBODIMENTS

Figure 6:
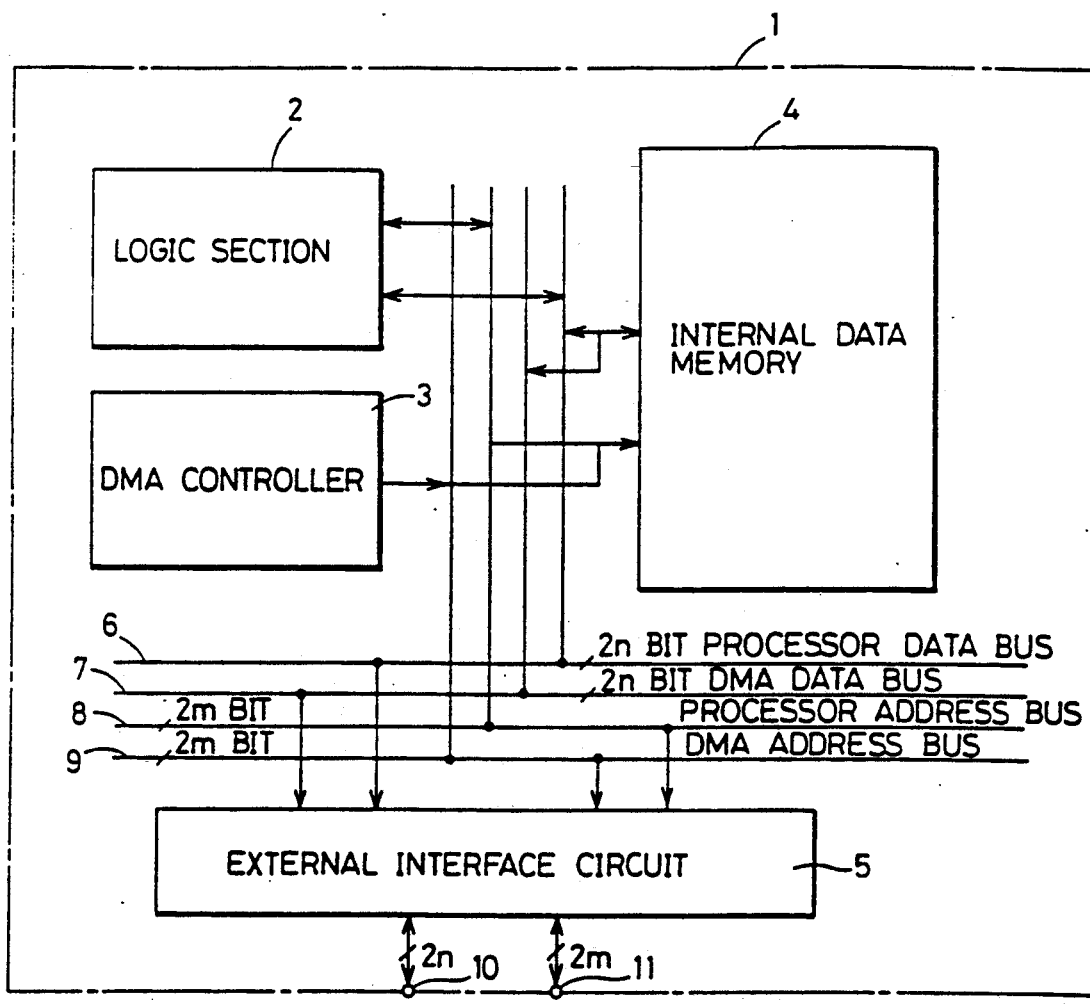
FIG. 6 is a schematic block diagram showing the entire arrangement of a processor containing a conventional DMA controller.
Figure 7:
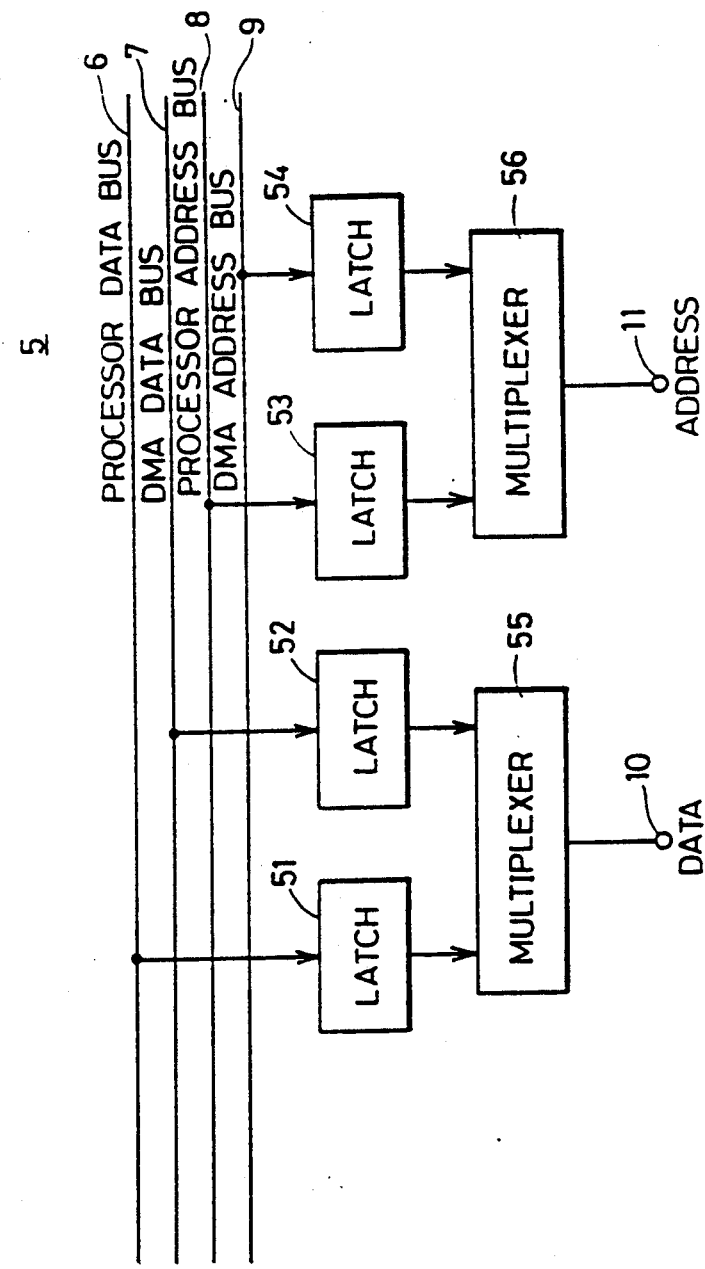
FIG. 7 is a block diagram of an external interface circuit shown in FIG. 6.
Figure 8:
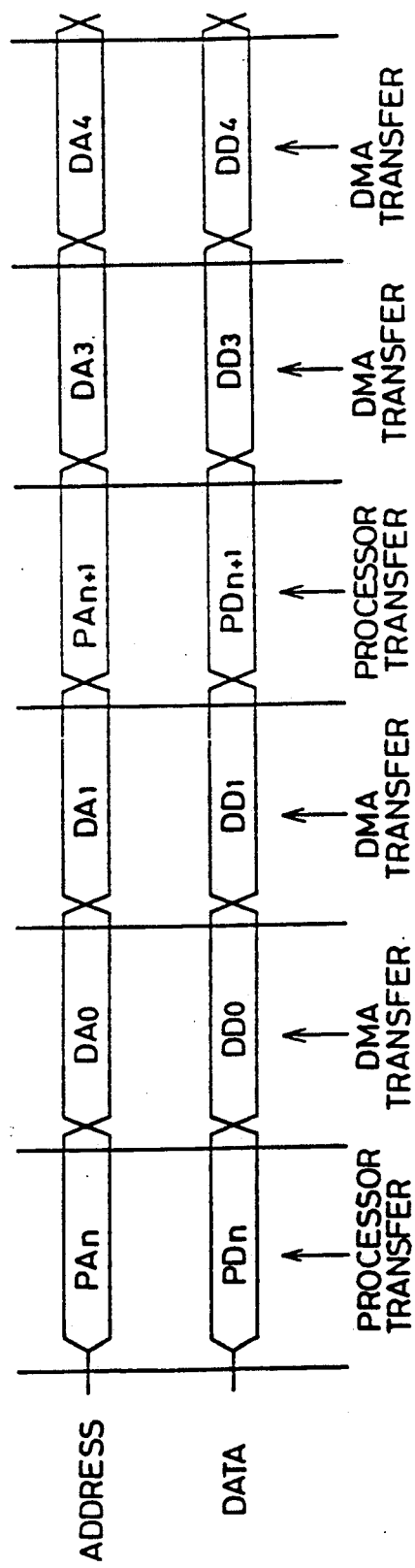
FIG. 8 is a timing chart for explaining the external interface circuit shown in FIG. 7.

FIG. 1 is a schematic block diagram of an embodiment of this invention. FIG. 1 is the same as FIG. 6 described above, except for the following points: An external interface circuit 50 outputs 2 n-bit data, converted into lower n-bit data and higher n-bit data, to terminals 10 and 11.

FIG. 2 is a more specific block diagram of the external interface circuit 50 shown in FIG. 1. The external interface circuit 50 shown in FIG. 2 is provided with multiplexers 57 and 58 in addition to the external interface circuit 5 shown in FIG. 1, said multiplexer 57 being given the 2 n-bit data latched in the latch 51 as it is bisected and being also given the n-bit data which are part of the 2 n-bit data selected by the multiplexer 55. The multiplexer 57 selects the output of the latch 51 or the output of the multiplexer 55 and outputs it to the higher data terminal 12. The 2 n-bit data latched in the latch 52 is bisected and given to the multiplexer 58, which is also given the n-bit data which are the other part of the 2 n-bit data outputted from the multiplexer 55. The multiplexer 58 selects the output of the latch 52 and the output of the multiplexer 55 and outputs them to the lower data terminal 13.

The 2 m-bit address latched in the latch 53 is bisected and given to the multiplexer 59, which is also given the m-bit address which is one part of the 2 m-bit address selected by the multiplexer 56. The multiplexer 59 selects the output of the latch 53 and the output of the multiplexer 56 and outputs them to the higher address terminal 14. The 2 m-bit address is bisected and given to the multiplexer 60, which is also given the 2 m-bit address in the multiplexer 56. The multiplexer 60 selects the output of the latch 54 and the output of the multiplexer 56 and outputs them to the lower address terminal 15.

FIG. 3 is a timing chart, according to which the processor singly operates in an embodiment of the invention. FIG. 4 is an operation timing chart for the concurrent operation of the processor and the DMA controller.

Referring to FIGS. 1 through 4, an embodiment of the invention will now be described. The 2 n-bit data outputted to the processor data bus 6 are latched in the latch 51, and the latched 2 n-bit data are selected by the multiplexer 55. For example, the higher n-bit data are selected by the multiplexer 57, and outputted to the higher data terminal 12 at timing t1, as shown in FIG. 3 (c), while the lower n-bit data are selected by the multiplexer 58, and outputted to the lower data terminal 13 at timing t1, as shown in FIG. 3 (d).

On the other hand, the 2 m-bit address outputted to the processor address bus 8 is latched in the latch 53, and the latched 2 m-bit address is selected by the multiplexer 56. For example, the higher m-bit address is selected by the multiplexer 59 and outputted to the higher address terminal 14 at timing t1, as shown in FIG. 3 (a), while the lower m-bit address is selected by the multiplexer 60 and outputted to the lower address terminal 15 at timing t1, as shown in FIG. (b).

When the processor singly operates in this manner, the 2 m-bit data are divided into the higher and lower, which are concurrently transferred, while the 2 m-bit processor address is likewise divided into the higher and lower, which are concurrently outputted to the higher and lower address terminals 14 and 15, respectively.

During concurrent operation, the 2 n-bit data outputted to the processor data bus 6 are latched in the latch 51; the 2 n-bit DMA data outputted to the DMA data bus 7 are latched in the latch 52; the 2 m-bit processor address outputted to the processor address bus 8 is latched in the latch 53; and the 2 m-bit address outputted to the DMA address bus 9 is latched in the latch 54. The processor data latched in the latch 51 is divided into sets of n bits and then given to the multiplexer 57. The DMA data latched in the latch 52 is likewise divided into sets of n bits and then given to the multiplexer 58. The multiplexer 57 outputs the higher n-bit data which are part of the divided n-bit data to the higher data terminal 12 at timing t5, as shown in FIG. 4 (c) and also outputs the lower n-bit data to the lower data terminal 13 at timing t6 in a time division manner. Similarly, the multiplexer 58 outputs the lower n-bit data which are part of the divided n-bit DMA data to the lower data terminal 13 at timing t6 in a time division manner.

On the other hand, the 2 m-bit processor address latched in the latch 53 is divided into sets of m bits and then given to the multiplexer 59. The multiplexer 59 selects the initially divided m-bit processor address and outputs it to the higher address terminal 14 at timing t4, as shown in FIG. 4 (a) and then selects the other m-bit processor address and outputs it to the higher address terminal 14 at timing t5 in a time division manner. Further, the 2 m-bit DMA address latched in the latch 54 is divided into sets each consisting of m bits and then given to the multiplexer 60. The multiplexer 60 selects said divided address at timing t4 and outputs it to the lower address terminal 15 and then selects the other m-bit address and outputs it to the lower address terminal 15 in a time division manner.

As described above, according to this embodiment, even if the processor and the DMA controller concurrently operate, the processor data, DMA data, processor address and DMA address are transferred n bits and m bits each time, respectively, in a time division manner; therefore, transfer can be effected without keeping one of them waiting.

Figure 5B:
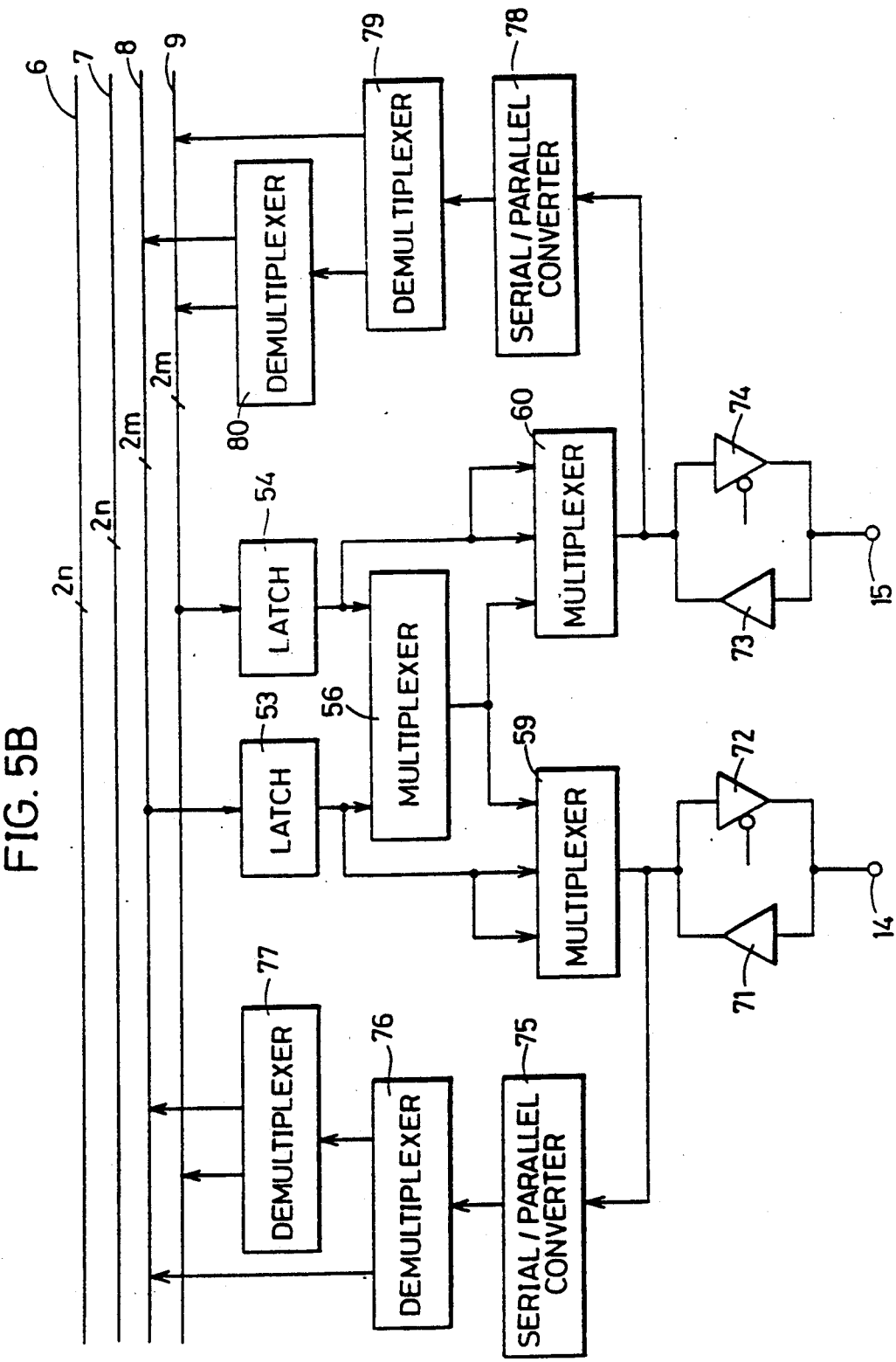

FIGS. 5A and 5B are block diagrams of an external interface circuit, showing a further embodiment of the invention. Particularly, FIG. 5A shows a data transfer section, while FIG. 5B shows an address transfer section, said section being adapted to transfer data and address in two directions.

The data transfer section shown in FIG. 5A comprises latches 51 and 52 and multiplexers 55, 57 and 58. A parallel combination of an input buffer 61 and an output tri-state buffer 62 is connected between the multiplexer 57 and the higher data terminal 12. The output tri-state buffer 62 is adapted to give the output of the multiplexer 57 to the higher data terminal 12, and the input buffer 61 is adapted to give the n-bit data, which is given to the higher data terminal 12, to a serial -parallel converter 65. The serial-parallel converter 65 converts the n-bit serial data into parallel data and gives the latter to a demultiplexer 66. The demultiplexer 66 selects data and gives the latter to the processor data bus 6 or demultiplexer 67, which then outputs the data given thereto to the processor data bus 6 or the DMA data bus 7.

A parallel combination of an input buffer 63 and an output tri-state buffer 64 is connected between the lower data terminal 13 and the multiplexer 58. The output tri-state buffer 64 is adapted to give the output of the multiplexer 58 to the lower data terminal 13, while the input buffer 63 gives the n-bit data, inputted to the lower data terminal 13, to a serial/parallel converter 68. The serial/parallel converter 68 converts the n-bit serial data into parallel date, and gives the latter to a demultiplexer 69. The demultiplexer 69 gives the data to the DMA data bus 7 or a demultiplexer 70. The demultiplexer 70 outputs the data given thereto to the processor data bus 6 or the DMA data bus 7.

The address transfer section shown in FIG. 5B is constructed in the same manner as the data transfer section shown in FIG. 5A. That is, in addition to the latches 53 and 54 and the multiplexers 56, 59 and 60, it includes input buffers 71 and 73, output tri-state buffers 72 and 74, serial/parallel converter 75 and 78, and demultiplexers 76, 77, 79 and 80.

Data transfer with no concurrent operation will now be described. In addition, transfer from the process data bus 6 or DMA data bus 7 to the higher data terminal 12 or lower data terminal 13 differs from that for the embodiment shown in FIG. 2 only in that it is effected through the output tri-state buffers 62 and 64; therefore, the description of the same operation will not be repeated, and a description will be given of the operation for transferring the data from the upper and lower date terminals 12 and 13 to the processor data bus 6 or DMA data bus 7. When n-bit data are inputted to the higher data terminal 12 and lower data terminal 13, said data are given to the serial/parallel converters 65 and 68 via the input buffers 61 and 63 and converted into parallel data. The parallel data are transferred to the demultiplexers 67 and 70 by the demultiplexers 66 and 69 and then they are transferred to the process data bus 6 by the demultiplexers 67 and 70. Similarly, DMA data are transferred to the DMA data bus 7 by the demultiplexer 67 and 70.

Concurrent operation will now be described. First, n-bit processor data are given from the higher data terminal 12 via the input buffer 61 to the serial/parallel 65. On the other hand, n-bit DMA data are given from the lower data terminal 13 via the input buffer 63 to the serial/parallel converter 68. Subsequently, the n-bit processor data in the latter half are given to the serial/parallel converter 68 via the input buffer 63. The serial/parallel converter 65 converts the processor data consisting of sets of n bits into 2 n-bit data format and then transfers the latter to the processor data bus 6 via the demultiplexer 66. Similarly after the data fed in n bits each time in a time division manner have been converted into 2 n-bit data format by the serial/parallel converter 68, the DMA data are transferred to the DMA data bus 7.

In addition, the above description refers to an operation wherein processor data consisting of sets of n bits are transferred from the higher data terminal 12 to the processor data bus 6 and from the lower data terminal 13 to the DMA data bus 7. However, when processor data are being transferred from the higher data terminal 12 to the processor data bus 6, DMA data may be transferred from the DMA data bus 7 to the lower data terminal 13.

In addition, the address transfer section shown in FIG. 5B operates in the same manner as in the data transfer section. Further, the data transfer section may be arranged as shown in FIG. 5A and the address transfer section may be arranged to use the address sensor section shown in FIG. 2.

As has so far been described, according to this invention, in the case of no concurrent operation, 2 n-bit data or address is outputted at once from the 2 n-bit data terminal or address terminal, whereas in the case of concurrent operation, 2 n-bit data or address is outputted from the address terminal in a time division manner; thus, without keeping one of then waiting, data or address for the processor and the DMA controller can be outputted, making it possible to obtain high transfer efficiency. Further, the circuit arrangement for obtaining this effect has only to have a minor additional circuit added thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor having connected thereto a 2 nb ($n \geq 1$) processor data bus and a 2 mb ($m \geq 1$) processor address bus, said processor containing a DMA controller having connected thereto a 2 nb DMA data bus and a 2 mb DMA address bus, said processor comprising:

latch means individually connected to said buses for storing data and addresses, first and second data input/output terminals for input/output of data, first and second address input/output terminals for input/output of addresses, first selection means for dividing one of either the 2 nb processor data and 2 nb DMA data latched in said latch means into sets of nb to output said sets of nb to said first and second data input/output terminals and for dividing one of either the 2 mb processor address and 2 mb DMA address into sets of mb to output said sets of mb to said first and second address input/output terminals when said processor and said DMA controller operating non-concurrently, and second selection means for dividing the 2 nb processor data and 2 nb DMA data latched in said plurality of latch means into sets of nb to output said sets of nb to said first and second data input/output terminals in a time division manner and for dividing either one of the 2 mb processor address and 2 mb DMA address into sets of mb to output said sets of mb to said first and second address input/output terminals in a time division manner when both said processor and said DMA controller operate concurrently.

2. The processor according to claim 1, wherein
when said processor and said DMA controller operate non-concurrently, one of either the 2 nb processor data and 2 nb DMA data latched in said latch means are divided into sets of nb and given to said first and second data input/output terminals and when said processor and DMA controller operate concurrently, the 2 nb processor data are divided into sets of nb and input to said first data input/output terminal in a time division manner while the 2 nb DMA data are divided into sets of nb and input to said second data input/out terminal, and said processor further comprising
conversion means for converting processor data and DMA data input to said first and second data input/output terminals into parallel data,
third selection means for supplying the 2 nb parallel data converted by said conversion means to one of either said processor data bus and said DMA data bus when said processor and said DMA controller operate non-concurrently, and
fourth selection means for supplying the processor data and DMA data converted nb each time in a time division manner by said conversion means to said processor bus and DMA data bus when said processor and said DMA controller operate concurrently.

3. The processor according to claim 1, wherein
when said processor and said DMA controller operate non-concurrently, one of either said 2 mb processor address and 2 mb DMA address is divided into sets of mb and given to aid first and second address input/output terminals, but when said processor and said DMA controller operate concurrently, the 2 mb processor address is input for mb in a time division manner to said first address input/output terminal and the 2 mb DMA address is input for mb in a time division manner to said second address input/output terminal, said processor further including
conversion means for converting one of either the processor address and DMA address input to said first and second address input/output terminal into a parallel address,
firth conversion means for supplying the 2 mb parallel address converted by said conversion means to one of either said processor address bus and said DMA address bus when said processor and said DMA controller operate non-concurrently, and
sixth selection means for supplying the processor address and DMA address converted for mb in a time division manner to said processor address bus and DMA address bus when said processor and said DMA controller operate concurrently.

4. A processing unit containing a DMA controller as set forth in claim 1, wherein said latch means comprises
first latch means connected to said processor data bus,
second latch means connected to said DMA data bus,
third latch means connected to said processor data bus, and
fourth latch means connected to said DMA address bus.

5. A processing unit containing a DMA controller as set forth in claim 4, wherein said first selection means comprises
first data selecting means for dividing 2 nb processor data and DMA data latched in said first and second latch means into sets of nb for the higher and lower and supplying said sets of nb, and
first address selecting means for dividing 2 mb processor address and DMA address latched in said third and fourth latch means into sets of mb for the higher and lower and supplying said sets of mb.

6. A processing unit containing a DMA controller as set forth in claim 5, wherein said second selection means comprises
second data selecting means for supplying 2 nb processor data latched in said first latch means for nb in a time division manner or selectively supplying higher nb processor data or higher nb DMA data output from said first data selecting means to said first data input/output terminals,
third data selecting means for supplying 2 nb DMA data latched in said second latch means for nb in a time division manner or selectively supplying the lower nb processor data or lower nb DMA data output from said first data selecting means to said second data input/output terminal,
second address selecting means for supplying the 2 mb processor address latched in said third latch means for mb in a time division manner or selectively supplying the higher mb processor address or higher mb DMA address output from said first address selecting means to said first address input/output terminal, and
third address selecting means for selectively supplying the 2 mb DMA address latched in said fourth latch means for mb in a time division manner or selectively supplying the lower mb processor address or lower mb DMA address output from said first address selecting means to said second address input/output terminal.

* * * * *